(12) United States Patent
Li et al.

(10) Patent No.: US 9,118,258 B2
(45) Date of Patent: Aug. 25, 2015

(54) SWITCHING POWER CONVERTER AND CONTROL METHOD THEREOF

(75) Inventors: Yike Li, Chengdu (CN); Paul Ueunten, San Jose, CA (US)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 523 days.

(21) Appl. No.: 13/618,512

(22) Filed: Sep. 14, 2012

(65) Prior Publication Data
US 2013/0070485 A1    Mar. 21, 2013

(30) Foreign Application Priority Data
Sep. 16, 2011    (CN) .......................... 2011 1 0275070

(51) Int. Cl.
*H02M 3/335*    (2006.01)
*H02M 1/42*    (2007.01)

(52) U.S. Cl.
CPC .......... *H02M 1/4225* (2013.01); *H02M 1/4258* (2013.01); *Y02B 70/126* (2013.01)

(58) Field of Classification Search
CPC ............ H02M 3/335; H02M 3/33507; H02M 3/33523; H02M 3/156–3/157; Y02B 70/126
USPC ...................... 363/21.01–21.18; 323/222, 282
See application file for complete search history.

(56) References Cited

U.S. PATENT DOCUMENTS

| | | | | |
|---|---|---|---|---|
| 7,889,517 B2 * | 2/2011 | Artusi et al. | ..................... | 363/16 |
| 8,379,420 B2 * | 2/2013 | Orr | ................................ | 363/80 |
| 8,587,967 B2 * | 11/2013 | Cohen | ........................ | 363/21.04 |

* cited by examiner

*Primary Examiner* — Adolf Berhane
*Assistant Examiner* — Yemane Mehari
(74) *Attorney, Agent, or Firm* — Perkins Coie LLP

(57) ABSTRACT

A switching power converter with an input terminal configured to receive a first input voltage; an output terminal configured to provide an output current to a load, wherein the output current has a peak value and an average value; a power switch; a first loop coupled to the input terminal, wherein the first loop configured to generate a first output signal based on the first input voltage; a second loop configured to generate a second output signal based on the output current; a multiplier configured to generate a multiplying signal based on multiplying the first output signal with the second output signal; and a driving circuit configured to generate a driving signal based on the multiplying signal to control the power switch, so as to reduce the ratio between the peak value and the average value of the output current.

20 Claims, 12 Drawing Sheets

SWITCHING POWER CONVERTER AND CONTROL METHOD THEREOF

CROSS-REFERENCE TO RELATED APPLICATION(S)

This application claims priority to and the benefit of Chinese Patent Application No. 201110275070.4, filed Sep. 16, 2011, which is incorporated herein by reference in its entirety.

TECHNICAL FIELD

The present invention relates generally to electronic converters, and more particularly but not exclusively to switching power converters and control methods thereof.

BACKGROUND

The conventional AC-DC converter, for example, PFC (Power Factor Correction) converter, comprises a bridge rectifier and a boost converter. FIG. 1A schematically shows a prior art PFC converter. The PFC converter comprises a main circuit 101 and a control circuit 102. The main circuit 101 comprises a bridge rectifier and a boost converter. The bridge rectifier comprises diodes D1~D4. An AC power supply having a first terminal "L" and a second terminal "N" is supplied to the input terminals of the bridge rectifier. Output terminals of the bridge rectifier are coupled to input terminals of the boost converter. The boost converter comprises an inductor L1, a power switch S1, a rectifier D5 and an output capacitor $C_O$. The boost converter provides an output voltage $V_O$ at an output terminal. A load LED is coupled between the output terminal of the boost converter and one terminal of a resistor $R_L$. The voltage at the common node F of the LED and the resistor RL is $U_F$.

The control circuit 102 comprises a first loop, a second loop, a multiplier and a driving circuit. The first loop comprising a dividing circuit 103 and a circuit 104 is used to control the input current or the inductor current. The dividing circuit 103 comprising resistors R2 and R3 is used to sense the first input voltage $V_{HS1}$, so as to get a second input signal $V_{HS2}$ at the common node of resistors R2 and R3. The circuit 104 generates an output signal $V_{HS3}$ by amplifying or normalizing the second input signal $V_{HS2}$.

The second loop comprises an amplifier 105 and a compensation network which is consisted by a resistor R1 and a capacitor C1. The second loop is configured to generate a second output signal $V_{O2}$. A first input terminal of the amplifier 105 is connected to a voltage reference REF while a second input terminal of the amplifier 105 is coupled to the output terminal of the PFC converter by a low pass filter 106. Due to the existence of the filter 106, the voltage at the second input terminal of the amplifier 105 would be stable even when the common node F has large voltage ripples.

The multiplier 107 is configured to provide a multiplying signal $V_{COM}$ through multiplying the output signal $V_{HS3}$ by the second output signal $V_{O2}$.

The driving circuit comprising a comparator 108 receives the multiplying signal $V_{COM}$ and a current sampling signal CS, and generates a driving signal $V_{DRV}$ to turn on/off the power switch S1.

Generally, a large output capacitor $C_O$ is used to get a stable output voltage $V_O$ that may be as high as 400V. A large capacitor that is able to withstand a high voltage is not only expensive, but may be easily damaged. A smaller output capacitor $C_O$ is preferred, but will cause a large ripple on the LED current.

For a typical PFC converter as shown in FIG. 1A, due to power factor correction, the first input current $I_{HS1}$ and/or inductor current signal $I_{L1}$ have a same frequency and phase with the first input voltage $V_{HS1}$. The first input voltage $V_{HS1}$ can be expressed as $$V_{HS1}=A|\text{Sin}(2\pi\omega t)| \qquad (1)$$

wherein A is the amplitude of the first input voltage $V_{HS1}$. | | represents the absolute value, and $\omega$ is the angular frequency. Assuming that the amplitude of the inductor current $I_{L1}$ is B, then the inductor current $I_{L1}$ could be expressed as, $$I_{L1}=B|\text{Sin}(2\pi\omega t)| \qquad (2)$$

Assuming that the conversion efficiency is close to 100%, according to the power conservation law, we can get $$V_{HS1} \times I_{L1}=V_O \times I_{LED} \qquad (3)$$

The LED current $I_{LED}$ could be expressed as, $$I_{LED} = \frac{V_{HS1} \times I_{L1}}{V_0} = \frac{A \times B \times \text{Sin}^2(2\pi\omega t)}{V_0} \qquad (4)$$

VO could be regarded as a constant since the voltage across the LED would not vary obviously with the LED current. Then, the LED current ILED is a square of a sinusoidal function. The ratio between the peak value and the average value (PAPR) of the LED current ILED is 2. This will reduce LED life greatly. According to the equation (3), the input power of the Boost converter could be maintained substantially constant if the inductor current IL1 expressed as $$I_{L1} = \frac{C}{\text{Sin}(2\pi\omega t)} \qquad (5)$$

can be obtained. The sin function in the equations (1) and (5) could be counteracted. Accordingly, as shown in FIG. 1B, the LED current $I_{LED}$ would remain substantially constant. However, the inductor current shown in equation (5) will cause the power factor of the PFC converter to be particularly low. So, converters and methods that could get a stable LED current and also a high power factor are required.

SUMMARY

In accordance with an embodiment of the present invention, a switching power converter, comprising: an input terminal configured to receive a first input voltage; an output terminal configured to provide an output current to a load, wherein the output current has a peak value and an average value; a power switch; a first loop configured to generate a first output signal based on the first input voltage; a second loop configured to generate a second output signal based on the output current; a multiplier configured to generate a multiplying signal based on multiplying the first output signal with the second output signal; and a driving circuit configured to generate a driving signal based on the multiplying signal to control the power switch, so as to reduce the ratio between the peak value and the average value of the output current.

Furthermore, there has been provided, in accordance with an embodiment of the present invention, a method for controlling a switching power converter, wherein the switching power converter is configured to provide an output current to a load from a first input voltage, and wherein the output current has a peak value and an average value, the method comprises: generating a first output signal based on the first input voltage; generating a second output signal based on the output current; multiplying the first output signal by the second output signal to generate a multiplying signal; and generating a driving signal based on the multiplying signal to control a power switch of the converter, so as to reduce the ratio between the peak value and the average value of the output current.

Furthermore, there has been provided, in accordance with an embodiment of the present invention, A switching power converter, comprising: an input terminal configured to receive a first signal having a first input voltage and a first input current; an output terminal configured to provide an output current to a load, wherein the output current has a peak value and an average value; a power switch; and a controller coupled to the input terminal and the output terminal, configured to control the first input current by turning on/off the power switch, so as to reduce the ratio between the peak value and the average value of the output current, wherein the average value of the first input current is proportional to the first input voltage in a first time period, inversely proportional to the first input voltage in a second time period, and proportional to the first input voltage in a third time period.

BRIEF DESCRIPTION OF THE DRAWINGS

Non-limiting and non-exhaustive embodiments are described with reference to the following drawings. The drawings are only for illustration purpose. Usually, the drawings only show part of the devices of the embodiments. These drawings are not necessarily drawn to scale. The relative sizes of elements illustrated by the drawings may differ from the relative size depicted.

DETAILED DESCRIPTION

In the present invention, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

It is to be understood in these letters patent that the meaning of "A" is coupled to "B" is that either A and B are connected to each other as described below, or that, although A and B may not be connected to each other as described below, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

Figure 2A:
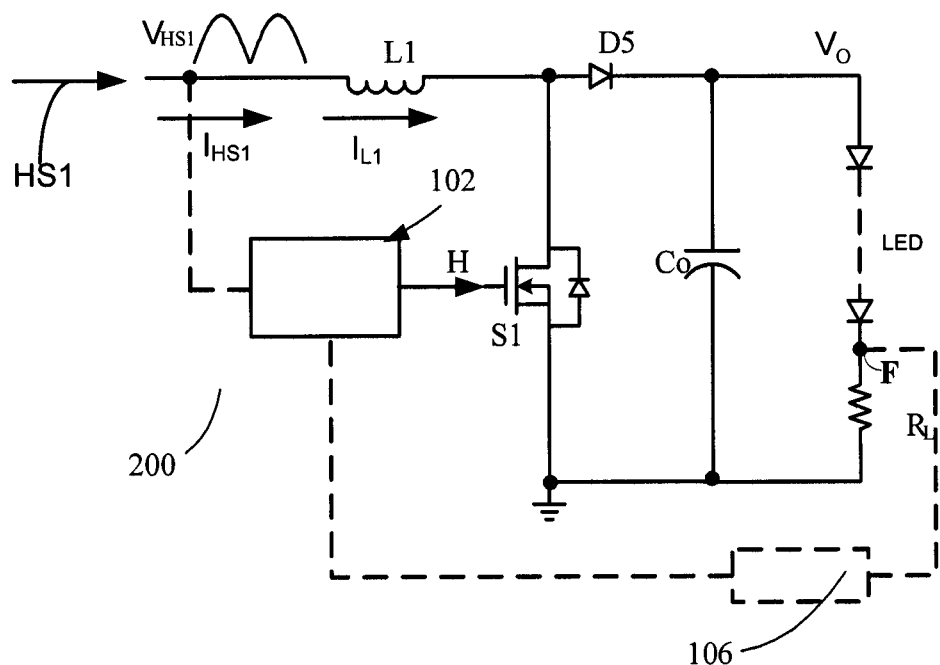
FIG. 2A shows a switching power converter in accordance with an embodiment of the present invention.

FIG. 2A shows a schematic block diagram of a switching power converter 200 according to an embodiment of the present invention. The switching power converter 200 comprises: a first terminal configured to receive a first input signal HS1 having a first input current $I_{HS1}$ and a first input voltage $V_{HS1}$; a freewheeling circuit comprising a power switch S1, an inductor L1 and a rectifier D5, configured to transfer the energy of the first input signal HS1 to an output terminal of the switching power converter by turning on/off the power switch S1. The first input current $I_{HS1}$ is proportional to the first input voltage $V_{HS1}$ in a first time period T1, inversely proportional to the first input voltage $V_{HS1}$ in a second time period T2, and proportional to the first input voltage $V_{HS1}$ in a third time period T3.

In the illustrated embodiment, the first input current $I_{HS1}$ is inputted into the inductor L1. So the first input current $I_{HS1}$ is substantially equal to the inductor current $I_{L1}$ if leakage current and other minor factors are neglected. In other embodiments, for example, in a Buck type converter, the first input current $I_{HS1}$ is inputted into the inductor L1 some time, such as, when a power switch coupled between an input terminal and a switching terminal is turned on. The inductor current $I_{L1}$ may mirror the first input current $I_{HS1}$ since the inductor current $I_{L1}$ should change continually.

Figure 2B:
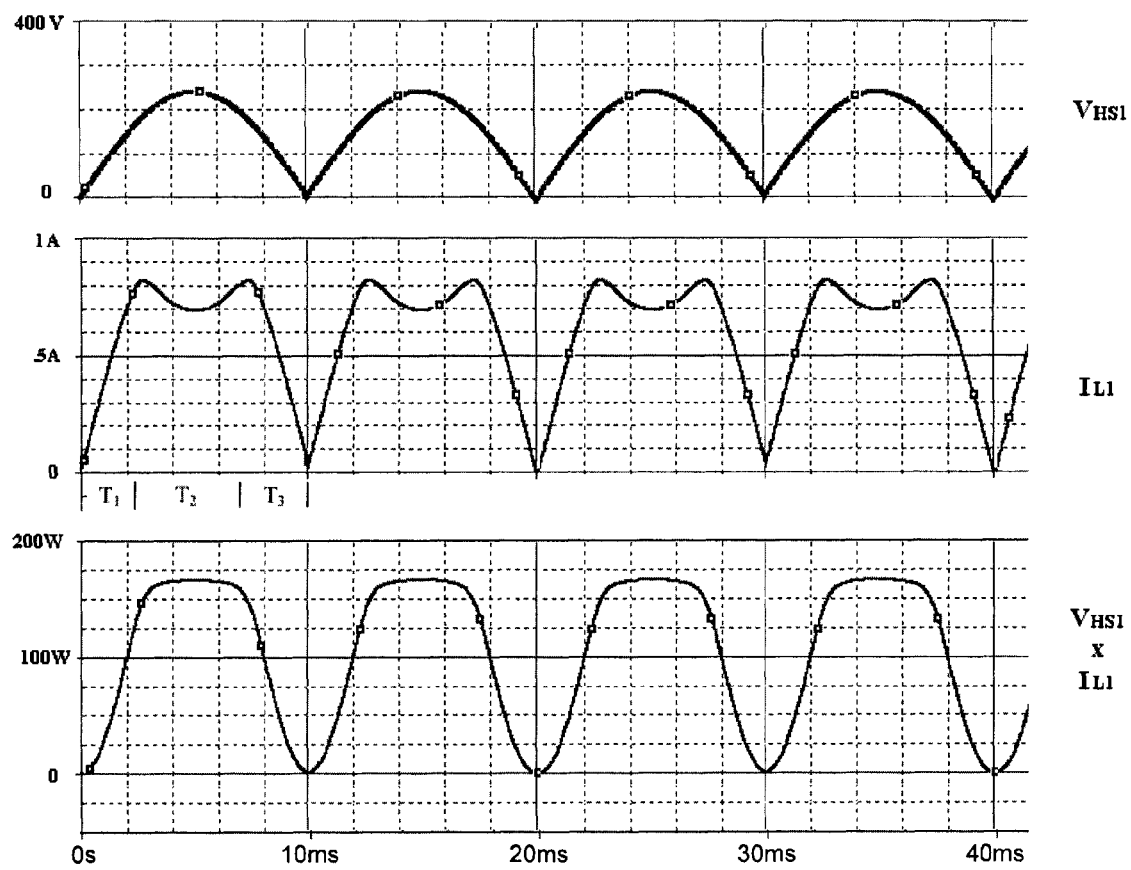
FIG. 2B shows operation waveforms of a switching power converter in accordance with an embodiment of the present invention.

As shown in FIG. 2B, in the first time period T1 and the third time period T3, the amplitude of the first input voltage $V_{HS1}$ and the average amplitude of the first input current $I_{HS1}$ are relatively small, so they have little effect on the input power, but a large effect on the power factor (PF). A high power factor may be achieved by keeping a proportional relationship between the amplitude of the first input voltage $V_{HS1}$ and the average amplitude of the first input current $I_{HS1}$. In the second time period T2, the amplitude of the first input voltage $V_{HS1}$ and the average amplitude of the first input current signal $I_{HS1}$ are relatively large, so they have a large effect on the input power, but a minor effect on the power factor (PF). Nearly constant input power may be achieved by keeping an inversely proportional relationship between the amplitude of the first input voltage $V_{HS1}$ and the average amplitude of the first input current $I_{HS1}$.

According to an embodiment of the present invention, the first time period T1 is a time period when the first input current $I_{HS1}$ rises from a first zero crossing point to a first inflection point within one cycle. The second time period T2 is a time period between the first inflection point and a third inflection point within one cycle. The third time period T3 is a time period when the first input current $I_{HS1}$ decreases from the third inflection point to a second zero crossing point within one cycle. The sum of the first time period T1, the second time period T2 and the third time period T3 is equal to one cycle of the first input current $I_{HS1}$.

As can be seen from FIG. 2B, the peak value of the product of the first input voltage $V_{HS1}$ and the inductor current $I_{L1}$ is greatly reduced, so as to lower the PAR while maintain a high power factor at same time. Simulation results show that the third harmonic is less than 20% and the fifth harmonic is less than 10%. Both harmonics are lower than harmonic standards, low harmonics means high power factor.

Due to the switching of the power switch S1, the first input current $I_{HS1}$ and the inductor current signal $I_{L1}$ are both saw tooth signals. According to some embodiments, a variety of current control modes can be used to make the amplitude of the first input voltage $V_{HS1}$ and the average amplitude of the first input current $I_{HS1}$ have a proportional relationship in the first time period T1 and the third time period T3, and an inversely proportional relationship in the second time period T2.

Figure 3A:
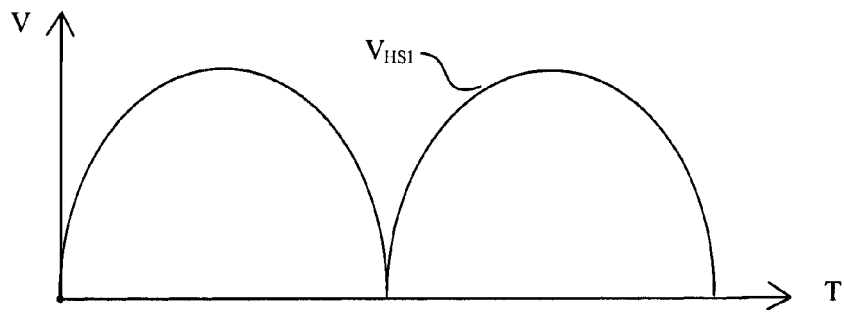
FIG. 3A to 3E show operation waveforms of a switching power converter in accordance with embodiments of the present invention.
Figure 3B:
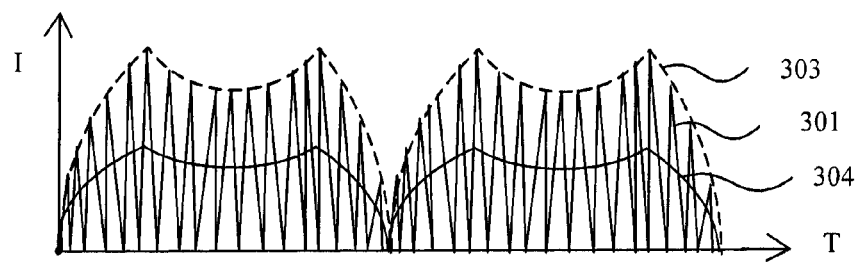
Figure 3C:
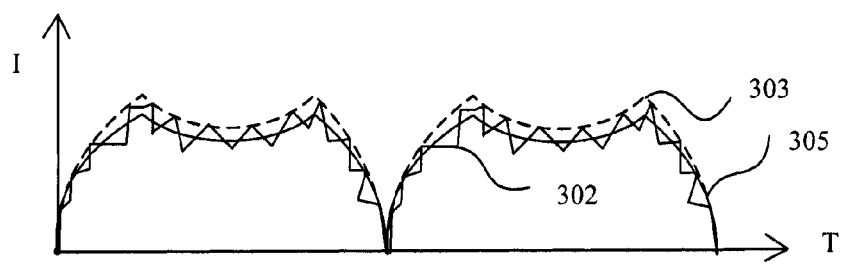

As shown in FIG. 3A to FIG. 3E, horizontal axes represent time and vertical axes represent voltage (V) or current (I). FIG. 3A illustrates a first input voltage $V_{HS1}$ which is half-wave sinusoidal. In one embodiment, a peak current control mode is used. 301 and 302 shown in FIGS. 3B and 3C are discontinuous/continuous inductor currents of switching power converters using the peak current control mode. When the inductor current 301 or 302 rises to a reference current 303, the switch is turned off and the inductor current 301 or 302 begins to decrease. 304 and 305 shown in FIGS. 3B and 3C are average values of the inductor currents 301 and 302.

Figure 3D:
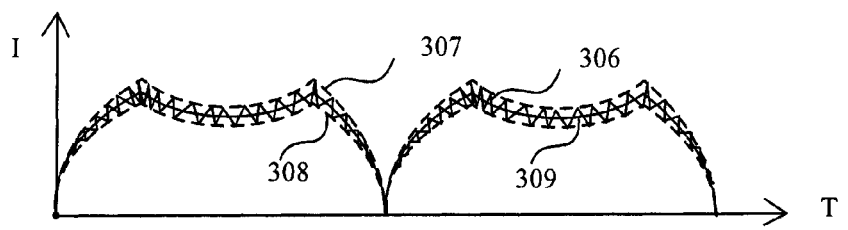

As shown in FIG. 3D, in an embodiment, a hysteresis current control mode is used. The inductor current 306 rises when the switch is turned on. The power switch S1 is turned off when the inductor current 306 exceeds an upper limit threshold 307. Then, the inductor current 306 begins to decrease. The power switch S1 is turned on again when the inductor current 306 decreases to a lower limit threshold 308. 309 shown in FIG. 3D is the average value of the inductor current 306.

Figure 3E:
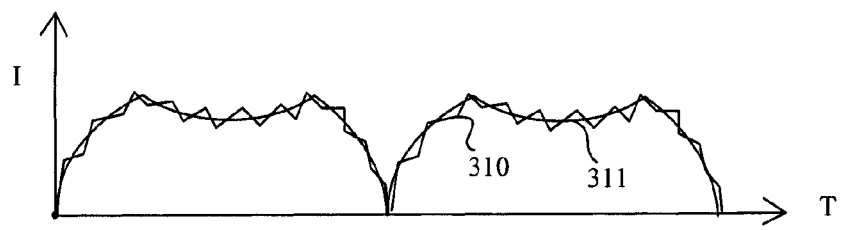

In another embodiment, as shown in FIG. 3E, an average current control mode is used. The inductor current 310 rises when the switch is turned on. The switch is turned off when the inductor current 310 exceeds an average current 311 with a third threshold. Then, the inductor current 310 begins to decrease. The switch is turned on again when the inductor current 310 is lower than the average current 311 with a fourth threshold. The third threshold and the fourth threshold are equal.

In other embodiments, CCM/DCM border control mode, current clamp control mode and other control modes can also be used.

Figure 4A:
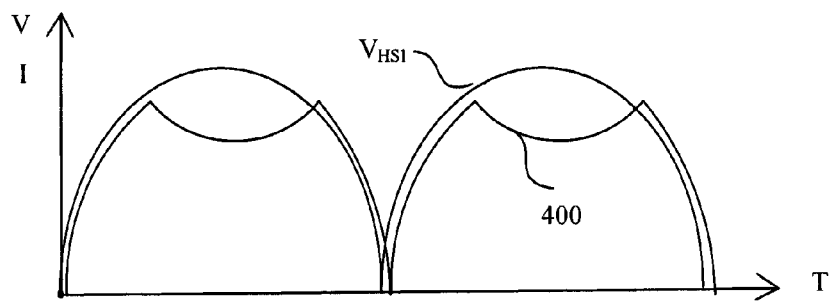
FIGS. 4A to 4D show operation waveforms of a switching power converter in accordance with embodiments of the present invention.

Due to the negative feedback of the switching power converter, the first input current $I_{HS1}$ and the inductor current $I_{L1}$ both lag behind the first input voltage $V_{HS1}$. Normally, the time delay is about several tens of microseconds. So, it is hard to keep the current proportional or inversely proportional to the voltage signal at any time. As shown in FIG. 4A, an inductor current 400 is lagging the first input voltage $V_{HS1}$ with about 20 us. This delay can be ignored since one cycle of the input voltage $V_{HS1}$ is more than several milliseconds.

Figure 4B:
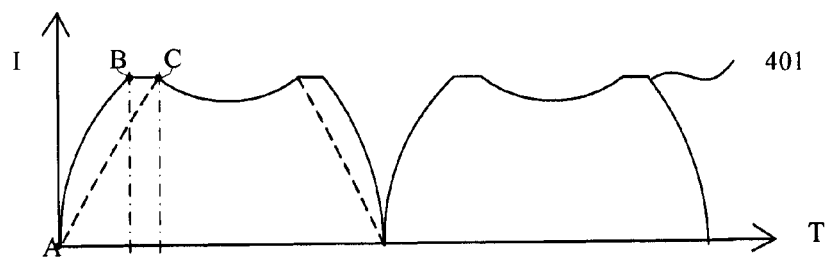
Figure 4C:
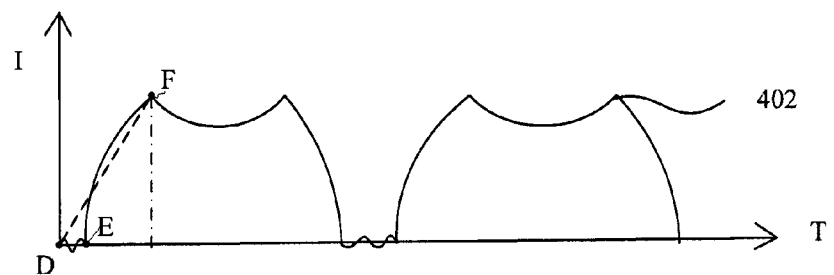
Figure 4D:
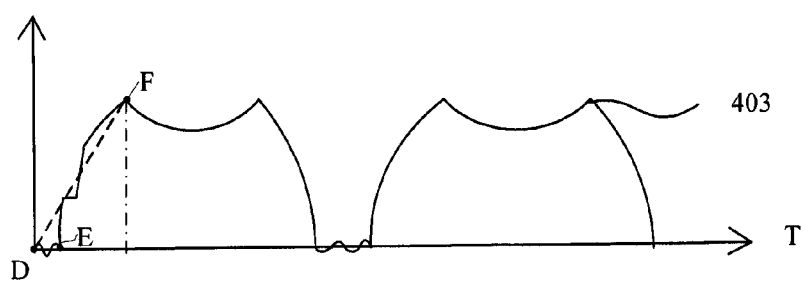

Due to circuit accuracy, noise, and non-linear effects, average value of the first input current $I_{HS1}$ or the inductor current $I_{L1}$ may be not a perfect parabola, straight, sinusoidal, or other geometric curve. Referring to waveform of the average value of inductor current 401 shown in FIG. 4B, in BC time period, the average value of inductor current 401 remains substantially unchanged. But the average value of the inductor current 401 has a rising trend in the AC time period. So, the average value of the inductor current 401 is proportional to the first input voltage $V_{HS1}$ shown in FIG. 4A. Similarly, referring to waveform of the average values of inductor current 402 and 403 shown in FIGS. 4C and 4D, the average value of the inductor current 402 and 403 rings during the DE time period. But the average value of the inductor current 402 and 403 have a rising trend in the DF time period. So, the average value of the inductor current 402 and 403 are proportional to the first input voltage $V_{HS1}$ shown in FIG. 4A.

Figure 5A:
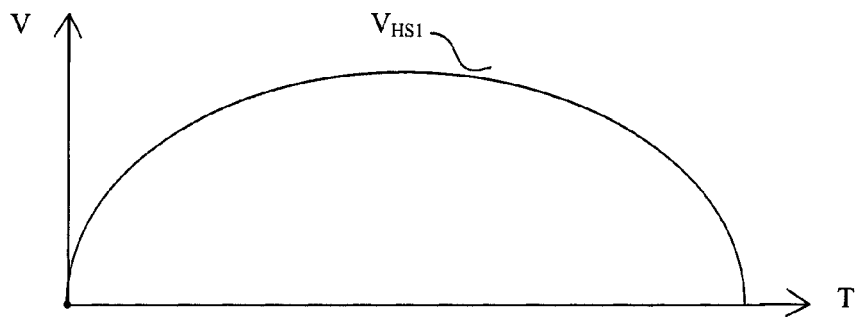
FIGS. 5A to 5C show operation waveforms of a switching power converter in accordance with embodiments of the present invention.
Figure 5B:
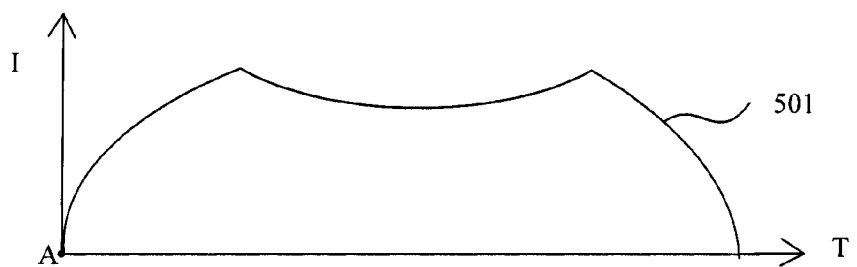

According to an embodiment of the present invention, referring to waveform 501 shown in FIG. 5B, the average value of first input current $I_{HS1}$ is linearly proportional to the first input voltage $V_{HS1}$ in the first time period T1, linearly proportional to the reciprocal of the first input voltage $V_{HS1}$ in the second time period T2, and linearly proportional to the first input voltage $V_{HS1}$ in the third time period T3. Wherein scale factors that represent the ratio of the first input voltage $V_{HS1}$ to the average value of the first input current $I_{HS1}$ in the first time period T1, the second time period T2 and the third time period T3 are KT1, KT2, and KT3 respectively. The scale factors KT1, KT2, KT3 may be equal, or unequal.

Figure 5C:
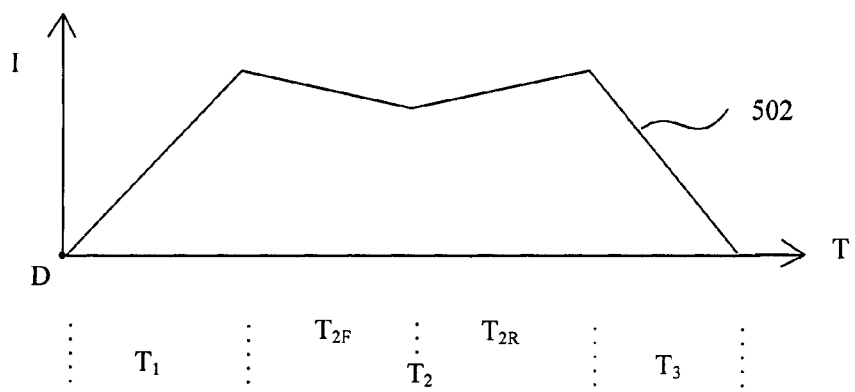

In an embodiment, the average values of the first input current $I_{HS1}$ and the inductor current $I_{L1}$ may be a linear curve, such as 502 shown FIG. 5C. In other embodiments, it also may be a combination of 501 and 502, or other irregular graphics.

According to an embodiment of the present invention, the second time period T2 includes: a second falling time period $T_{2F}$ wherein the first input current $I_{HS1}$ and/or the average value of the inductor current $I_{L1}$ are/is falling; and a second rising time period $T_{2R}$ wherein the first input current signal $I_{HS1}$ and/or the average value of the inductor current $I_{L1}$ are/is rising. In other embodiments, the second time period T2 may further comprise a second constant time period wherein the average values of the first input current signal $I_{HS1}$ and/or the inductor current $I_{L1}$ are/is substantially constant.

Figure 6A:
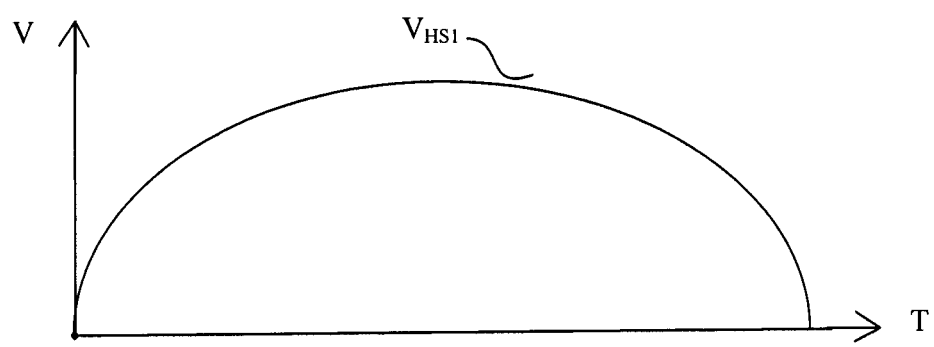
FIGS. 6A and 6B show operation waveforms of a switching power converter in accordance with embodiments of the present invention.
Figure 6B:
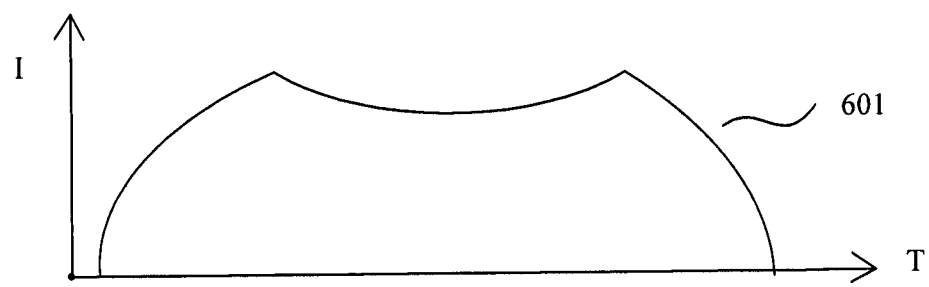

According to an embodiment of the present invention, the sum of the first time period T1, the second time period T2 and the third time period T3 is equal to one cycle of the first input voltage $V_{HS1}$. In another embodiment, as shown in FIGS. 6A and 6B, one cycle of the average values of input current signal $I_{HS1}$ and/or the inductor current further comprises an initial time period T0 and/or a fourth time period T4. Persons skilled in the art may regard T0 as part of T1, T4 as part of T3, so as to get a sum of the first time period T1, the second time period T2 and the third time period T3 be equal to one cycle of the first input Voltage $V_{HS1}$.

Figure 7A:
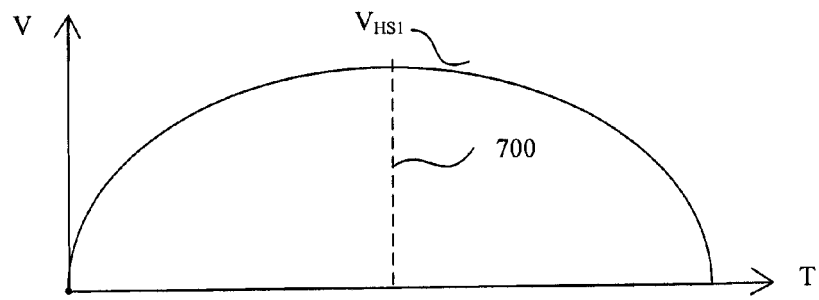
FIGS. 7A to 7D show waveforms of the input current in accordance with embodiments of the present invention.
Figure 7B:
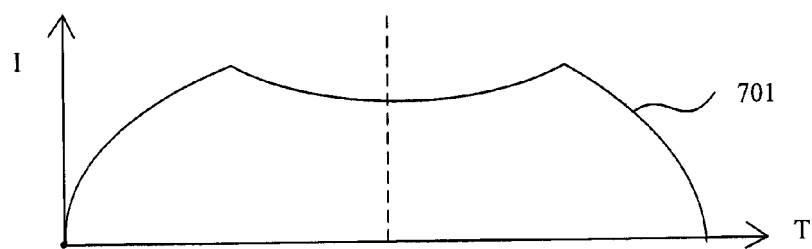
Figure 7C:
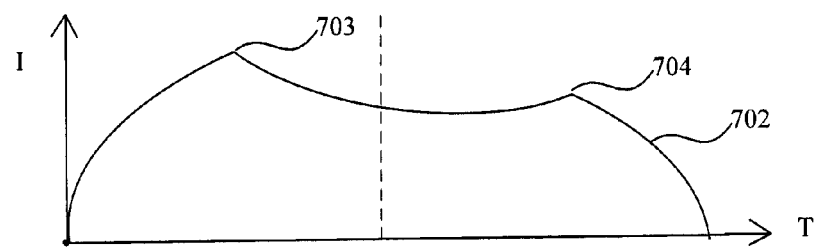
Figure 7D:
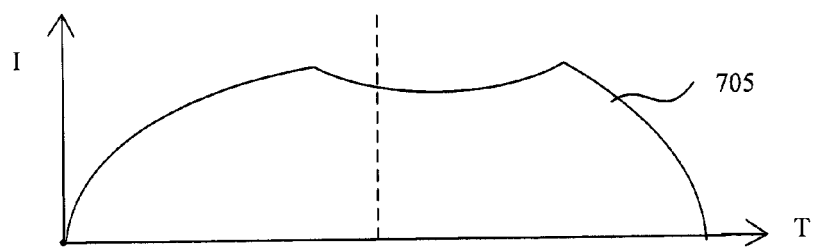

According to an embodiment of the present invention, as shown in FIG. 7A, the first input voltage $V_{HS1}$ could be divided into two shoulder at time 700. As shown in FIG. 7B, the left shoulder and the right shoulder of the average value of the inductor current 701 are symmetric. In another embodiment, as shown in FIG. 7C, the left shoulder 703 of the average value of the inductor current 702 is higher than the right shoulder 704. In another embodiment, as shown in FIG. 7D, the first time period T1 of the average value of the inductor current 705 is longer than the third time period T3. Left time period TL is shorter than the right time period TR.

Figure 8:
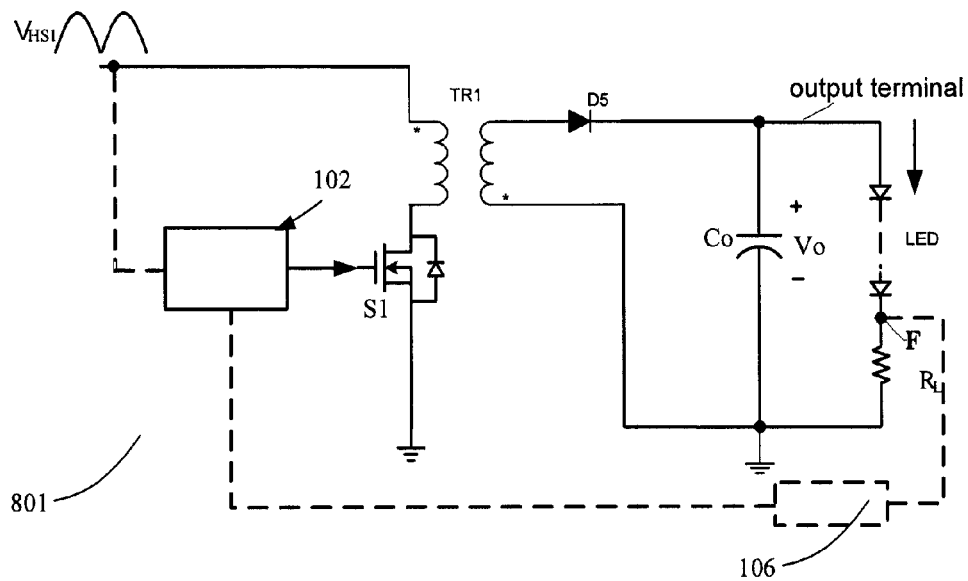
FIG. 8 shows a switching power converter in accordance with an embodiment of the present invention.

According to an embodiment of the present invention, wherein the inductor L1 is coupled between an input terminal and a switching terminal SW, the power switch S1 is coupled between the switching terminal SW and a ground terminal, the rectifier D5 is coupled between the switch terminal SW and an output terminal of the switching power converter, so as to form a Boost converter. In other embodiments, these devices may be configured in other topologies, such as buck, forward or flyback converters. Some embodiments of the present invention comprise a transformer. FIG. 8 shows a schematic block diagram of a switching power converter 801 according to an embodiment of the present invention. The difference between the system 801 and 200 is the replacement of inductor L1 by a transformer TR1. One skilled in the art may also regard the inductor L1 as a part of the transformer TR1, for example, a primary winding. The energy is transferred to the secondary winding for supplying a load (e.g., LED) by turning on and off the power switch S1.

According to an embodiment of the present invention, the switching power converter further comprises: a LED string coupled between the output terminal and a feedback terminal F of the switching power converter; and a feedback resistor coupled between the feedback terminal F and the ground terminal.

In another embodiment, a feedback resistor RL comprising resistors RL1 and RL2 is coupled to the output capacitor $C_O$ in parallel. The feedback resistor RL is coupled between the output terminal and the ground terminal, and provides a feedback signal at the common node of resistors RL1 and RL2.

Figure 1A:
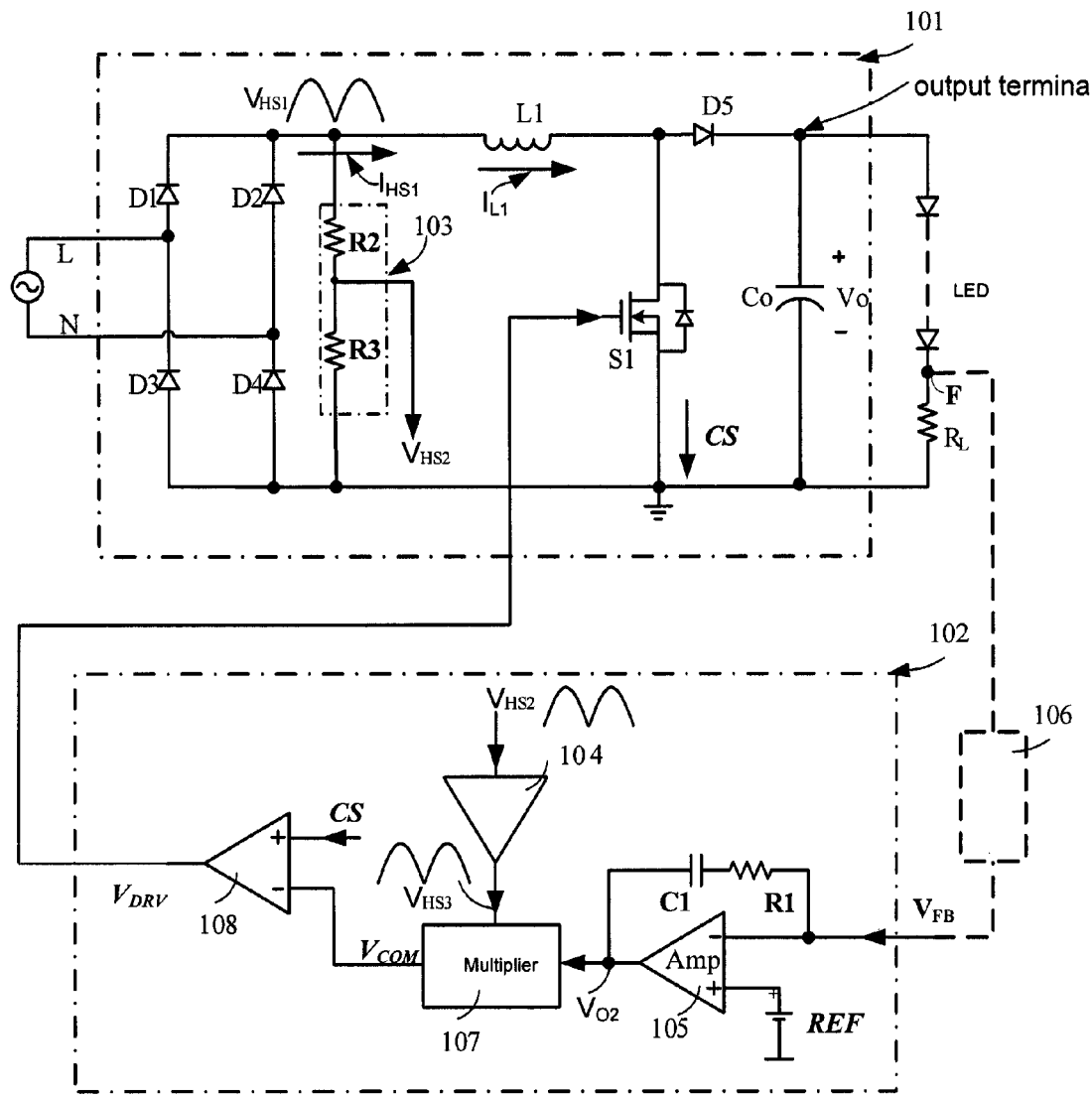
FIG. 1A shows a conventional power factor correction circuit.

It is well known that the phase and average amplitude of the first input current $I_{HS1}$ and/or the inductor current $I_{L1}$ is consistent with the phase and amplitude of the voltage signal $V_{HS3}$, as shown in FIG. 1A. So, the present invention can be realized by providing a voltage signal that has a same shape with the disclosed first input current $I_{HS1}$ and/or the inductor current $I_{L1}$ to the input terminal of the multiplier.

A switching power converter has been disclosed. The converter could get a stable LED current and also a high power factor. This is achieved by controlling the power switch to make the amplitude of a first input voltage $V_{HS1}$ and the average amplitude of a first input current $I_{HS1}$ have a proportional relationship in a first time period T1 and a third time period T3, and an inversely proportional relationship in a second time period T2. How to control the power switch S1 is not the objective of the present invention. Below, some specific embodiments of how to control the power switch S1 are provided, it is to be understood that these embodiments are for illustration purposes and not limiting.

Figure 9A:
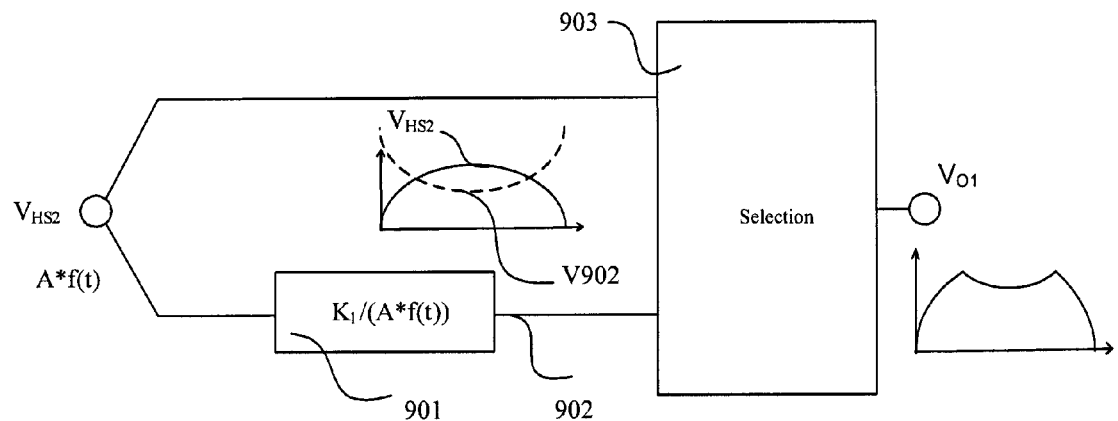
FIGS. 9A to 9D show signal generating circuits in accordance with embodiments of the present invention.

FIG. 9A shows a schematic block diagram of a signal generating circuit according to an embodiment of the present invention. The signal generating circuit 901 comprises a second input terminal to receive a second input signal $V_{HS2}$. The second input signal $V_{HS2}$ could be expressed as $$V_{HS2}=A \times f(t) \tag{6}$$

A is the amplitude and f(t) is a function of time.

A division circuit 901 coupled to the second input voltage signal $V_{HS2}$ is configured to generate a division signal 902. V902 represents the voltage of the division signal 902, it could be expressed as $$V902=K1/(A \times f(t)) \tag{7}$$

K1 is a division factor which may be a constant or a variable. By selecting an appropriate division factor, the second input signal $V_{HS2}$ may crosses the division signal 902. That is to say, the voltage amplitude of the second input signal $V_{HS2}$ may be lower than the voltage amplitude of the division signal 902 in a first time interval, and may be larger than the voltage amplitude of the division signal 902 in a second time interval. Normally, it is hard to design an ideal division circuit. So the division factor K1 may be varied. It could be regarded as a division circuit if a division signal 902 is inversely proportional to the second input signal $V_{HS2}$ may be achieved, wherein linear relationship is not necessary. The division signal 902 would be very large when the second input signal $V_{HS2}$ is close to the ground potential. But, due to the limitations of the circuit and power supply, a maximum value of the division signal may be set by the division circuit to get the division signal fixed during some time periods. This also does not depart from the scope of the present invention.

A selection circuit 903 is configured to generate a first output signal $V_{O1}$ by selecting the signal having the lower amplitude among the second input signal $V_{HS2}$ and the division signal 902. In one embodiment, the second input signal is a half-wave sinusoidal signal. The first output voltage signal $V_{O1}$ is proportional to the second input signal $V_{HS2}$ in a first time period T1, inversely proportional to the second input signal $V_{HS2}$ in a second time period T2, and proportional to the second input signal $V_{HS2}$ in a third time period T3.

Same as the first input current $I_{HS1}$/the inductor current $I_{L1}$, the first output signal $V_{O1}$ may also has time delay, phase lag or asymmetry, etc. The description, deformation and equivalent replacement with respect to the first input current $I_{IN1}$ and/or inductor current signal $I_{L1}$ may also apply to the first output signal $V_{O1}$.

When the amplitude of the second input signal $V_{HS2}$ increases, according to the equation (7), the amplitude of the signal 902 will be reduced. The left shoulder and the right shoulder are increased, the power factor and peak-average ratio are affected. A normalization circuit can be used to eliminate the influence from the amplitude of the second input signal $V_{HS2}$.

Figure 9B:
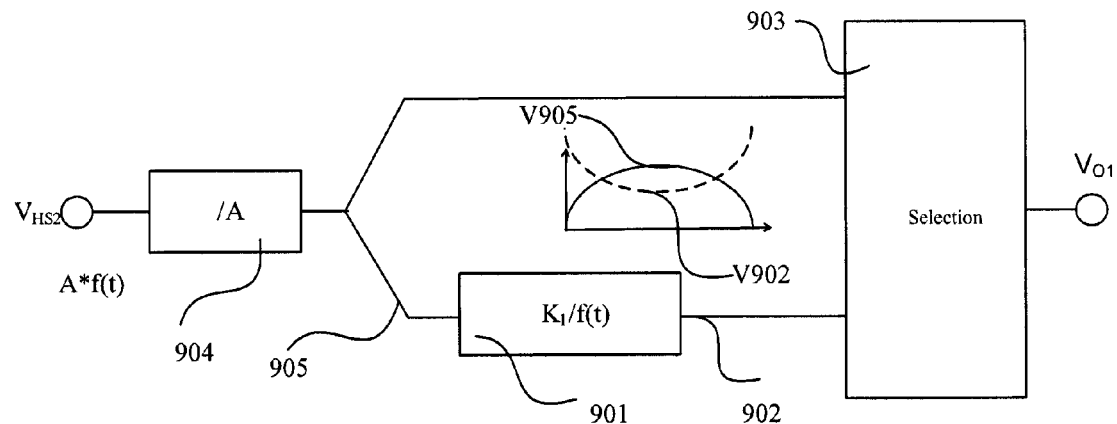

FIG. 9B shows a schematic block diagram of a signal generating circuit according to an embodiment of the present invention. A normalization circuit 904 is used to generate a normalization signal 905 by normalizing the second input voltage signal $V_{HS2}$. The voltage V905 of normalized signal 905 could be expressed as $$V905=V902/A=f(t) \tag{8}$$

The division circuit 901 receives the normalization signal 905, and generates the division signal 902 that is inversely proportional to the normalization signal 905. The selection circuit 903 is configured to generate the first output voltage signal $V_{O1}$ by selecting the signal having the lower amplitude among the normalization signal 905 and the division signal 902.

After being normalized, the amplitude of the normalization signal would be constant, so as to overcome varying of the left shoulder and the right shoulder caused by amplitude changing.

In some embodiments, the inflection points need to be adjusted. This could be realized by introducing a modulus circuit 906 to amplify the amplitude of the normalization signal 905.

Figure 9C:
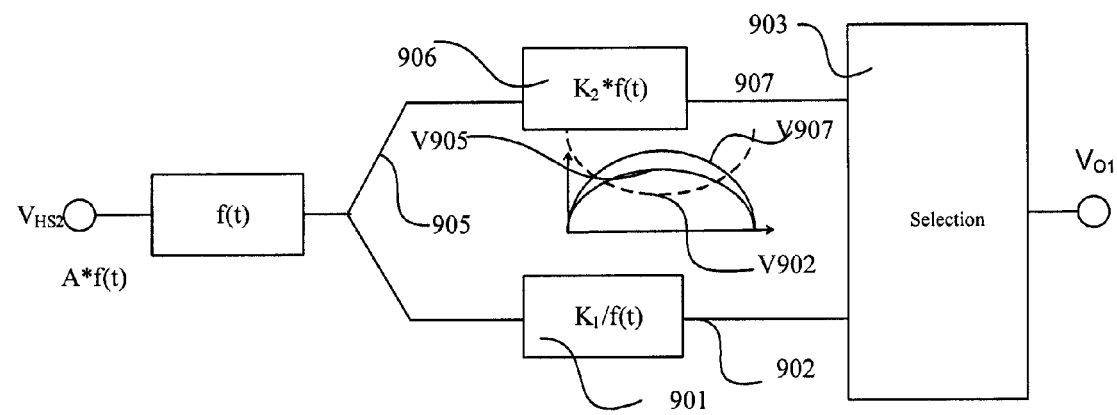

FIG. 9C shows a schematic block diagram of a signal generating circuit according to an embodiment of the present invention. A modulus circuit 906 is used to generate a modulus signal 907 by amplifying the normalization signal 905. The voltage V907 of modulus signal 907 could be expressed as, $$V907=K2 \times f(t) \tag{9}$$

K2 is a modulus factor which may be a constant or a variable.

The selection circuit 903 is configured to generate the first output voltage $V_{O1}$ signal by selecting the signal having the lower amplitude among the division signal 902 and the modulus signal 907.

Figure 9D:
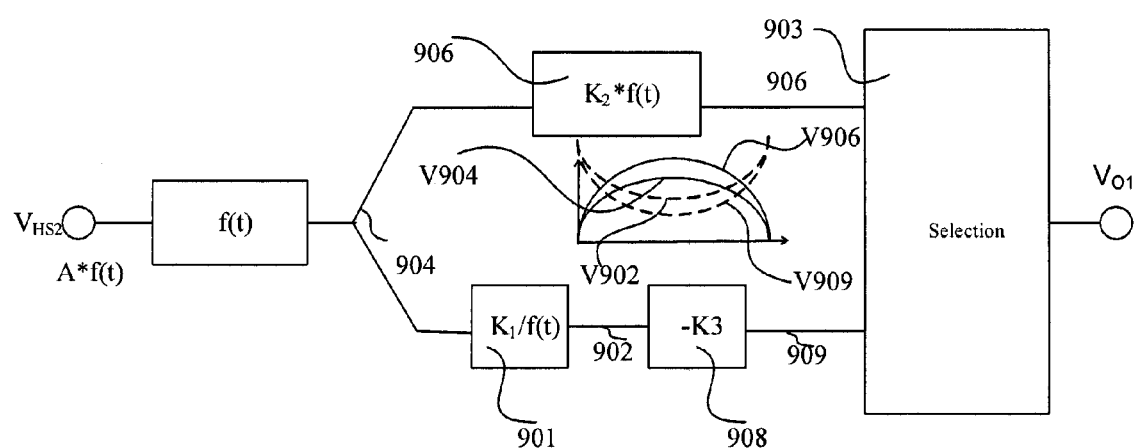

In some inventions, a subtraction circuit is introduced to adjust the infection points accurately. FIG. 9D shows a schematic block diagram of a signal generating circuit according to an embodiment of the present invention. A subtraction circuit 908 is used to generate a subtraction signal 909 by subtracting a subtraction voltage K3 from the division signal 902. The voltage V909 of the subtraction signal 909 could be expressed as, $$V909 = K1/f(t) - K3 \quad (10)$$

The subtraction factor K3 may be a constant or a variable.

The selection circuit 903 is configured to generate the first output voltage signal $V_{O1}$ by selecting the signal having the lower amplitude among the subtraction signal 909 and the modulus signal 906.

Introduction of the above-described signal generating circuits into the first loop (current control loop) of the switching power converter could obtain disclosed the first input current $I_{HS1}$ and/or the inductor current $I_{L1}$.

Figure 1B:
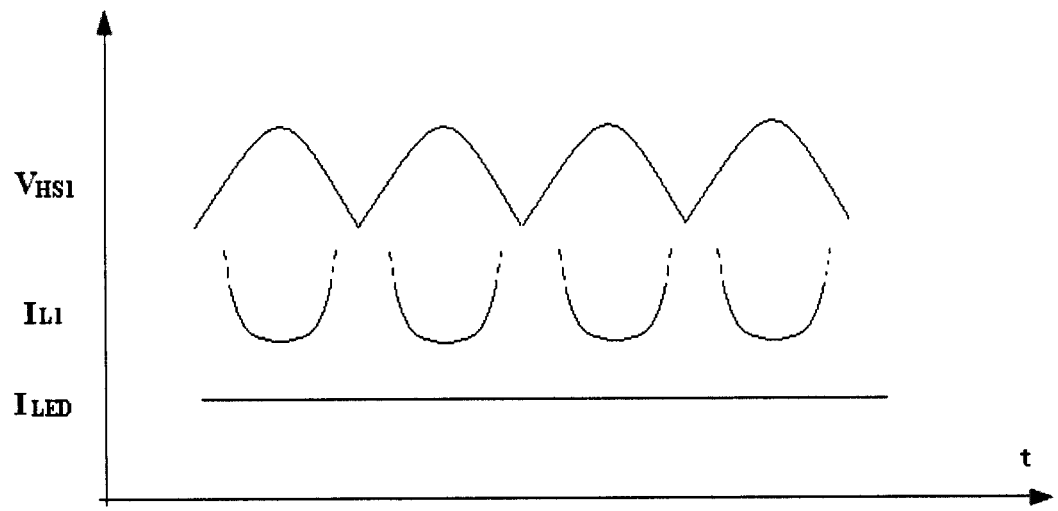
FIG. 1B shows operation waveforms in accordance with the conventional circuit of FIG. 1A.
Figure 10:
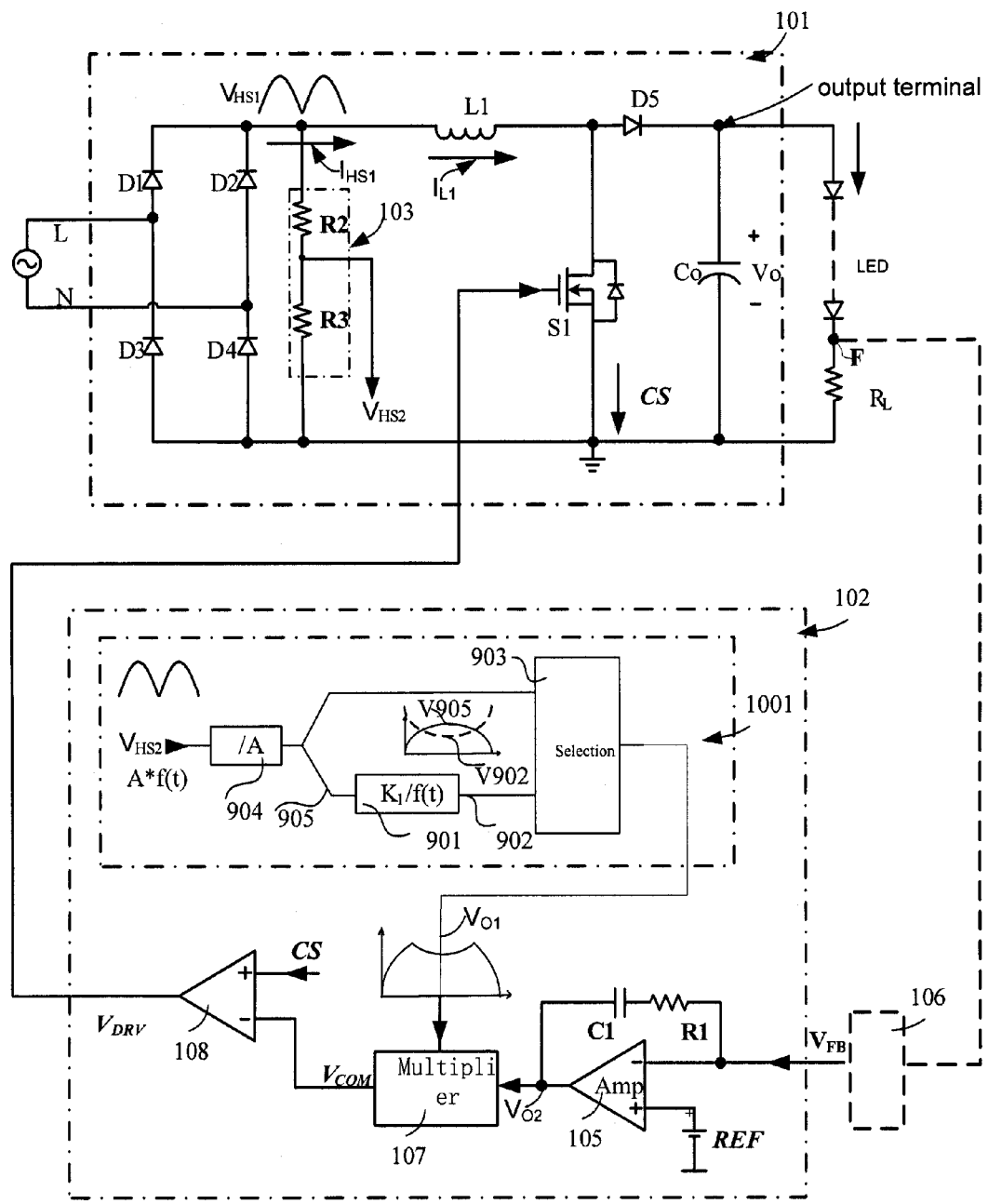
FIG. 10 shows a switching power converter in accordance with an embodiment of the present invention.

FIG. 10 shows a schematic block diagram of a switching power converter according to an embodiment of the present invention. The difference from the embodiment shown in FIG. 1 is the replacement of the circuit 104 by a signal generating circuit 1001.

The control circuit 102 comprises a first loop, a second loop, a multiplier and a driving circuit.

The first loop comprising a dividing circuit 103 and a signal generating circuit 1001 is used to control the input current or the inductor current. The dividing circuit 103 comprising resistors R2 and R3 is used to sense the first input voltage $V_{HS1}$, so as to get a second input signal $V_{HS2}$ at the common node of resistors R2 and R3. The signal generating 1001 comprises a normalization circuit 904, a division circuit 901, and a selection circuit. The normalization circuit 904 is used to generate a normalization signal 905 by normalizing the second input voltage signal $V_{HS2}$. The division circuit 901 receives the normalization signal 905, and generates the division signal 902 that is inversely proportional to the normalization signal 905. The selection circuit 903 is configured to generate the first output voltage signal $V_{O1}$ by selecting the signal having the lower amplitude among the normalization signal 905 and the division signal 902.

The second loop is configured to generate a second output signal $V_{O2}$. The multiplier 107 is configured to provide a multiplying signal $V_{COM}$ through multiplying the first output signal $V_{O1}$ by the second output signal $V_{O2}$. The driving circuit comprising a comparator 108 receives the multiplying signal $V_{COM}$ and a current sampling signal CS, and generates a driving signal $V_{DRV}$ to turn on/off the power switch S1, wherein the first input current $I_{HS1}$ is proportional to the first input voltage $V_{HS1}$ in a first time period T1, inversely proportional to the first input voltage $V_{HS1}$ in a second time period T2, and proportional to the first input voltage $V_{HS1}$ in a third time period T3.

A switching power converter has been disclosed. While specific embodiments of the present invention have been provided, it is to be understood that these embodiments are for illustration purposes and not limiting. Many additional embodiments will be apparent to persons of ordinary skill in the art reading this invention.

We claim:

1. A switching power converter, comprising:
   an input terminal configured to receive a first input voltage;
   an output terminal configured to provide an output current to a load, wherein the output current has a peak value and an average value;
   a power switch;
   a first loop coupled to the input terminal, wherein the first loop is configured to generate a first output signal based on the first input voltage, and wherein the first output signal is proportional to the first input voltage in a first time period, inversely proportional to the first input voltage in a second time period, and proportional to the first input voltage in a third time period;
   a second loop coupled to the output terminal, wherein the second loop is configured to generate a second output signal based on the output current;
   a multiplier coupled to the first loop and second loop, wherein the multiplier is configured to generate a multiplying signal based on multiplying the first output signal with the second output signal; and
   a driving circuit coupled to the multiplier, wherein the driving circuit is configured to generate a driving signal based on the multiplying signal to control the power switch, so as to reduce the ratio between the peak value and the average value of the output current.

2. The switching power converter of claim 1, wherein the first input voltage is a sinusoidal half-wave signal.

3. The switching power converter of claim 1, wherein the first input voltage is generated by a bridge rectifier supplied by an AC power supply.

4. The switching power converter of claim 1, wherein the converter further comprises:
   an inductor coupled between the input terminal and a switching terminal; and
   a rectifier coupled between the switching terminal and the output terminal;
   wherein the power switch is coupled between the switching terminal and a ground terminal.

5. The switching power converter of claim 1, wherein the converter further comprises an transformer having a primary winding and a secondary winding, wherein the primary winding is coupled between the input terminal and a switching terminal, the secondary winding is coupled between a ground terminal and the output terminal, the power switch is coupled between the switching terminal and the ground terminal.

6. The switching power converter of claim 1, wherein the first loop comprises:
   a dividing circuit coupled to the input terminal, wherein the dividing circuit is configured to generated a second input signal based on the input voltage; and
   a signal generating circuit coupled to the dividing circuit, wherein the signal generating circuit is configured to generate the first output signal based on the second input signal.

7. The switching power converter of claim 6, wherein the signal generating circuit comprises:
   a division circuit coupled to the dividing circuit to receive the second input signal, wherein the division circuit is configured to generate a division signal reversely proportional to the second input signal; and
   a selection circuit configured to generate the first output signal by selecting the signal having the lower amplitude among the second input signal and the division signal.

8. The switching power converter of claim 7, wherein the signal generating circuit further comprises:
   a normalization circuit coupled to the dividing circuit to receive the second input signal, wherein the normalization circuit is configured to generate a normalization signal by normalizing the second input voltage signal;
   the division circuit coupled to the normalization circuit, wherein the division circuit is configured to generate the division signal reversely proportional to the normalization signal; and
   the selection circuit configured to generate the first output signal by selecting the signal having the lower amplitude among the normalization signal and the division signal.

9. The switching power converter of claim 8, wherein the signal generating circuit further comprises:

a modulus circuit coupled to the normalization circuit, wherein the modulus circuit is configured to generate a modulus signal by amplifying the normalization signal; and the selection circuit configured to generate the first output signal by continuously selecting the signal having the lower amplitude among the division signal and the modulus signal.

10. The switching power converter of claim 9, wherein the signal generating circuit further comprises:

a subtraction circuit coupled to the division circuit, wherein the division circuit is configured to generate a subtraction signal by subtracting a subtraction voltage from the division signal; and the selection circuit configured to generate the first output signal by selecting the signal having the lower amplitude among a subtraction signal and the modulus signal.

11. The switching power converter of claim 1, wherein the first output signal is linearly proportional to the first input voltage in the first time period, linearly proportional to the reciprocal of the first input voltage in the second time period, and linearly proportional to the first input voltage in the third time period.

12. The switching power converter of claim 1, wherein the second time period comprises:

a second falling time period, wherein the first output signal is reduced during the second falling time period; and a second rising time period, wherein the first output signal is increased during the second rising time period.

13. The switching power converter of claim 1, wherein the sum of the first time period, the second time period and the third time period is equal to one cycle of the first input voltage.

14. The switching power converter of claim 1, wherein the second loop comprises:

an amplifier having a first input terminal, a second input terminal and an output terminal, wherein the first input terminal of the amplifier is connected to a voltage reference; the second input terminal of the amplifier is coupled to the output terminal of the switching power converter, and the output terminal of the amplifier is configured to provide the second output signal.

15. The switching power converter of claim 1, wherein the driving circuit comprises:

a comparator having a first input terminal, a second input terminal and an output terminal, wherein the comparator is configured to generate the driving signal by comparing the multiplying voltage signal with a current sampling signal.

16. A method for controlling a switching power converter, wherein the switching power converter is configured to provide an output current to a load from a first input voltage, and wherein the output current has a peak value and an average value, the method comprises:

generating a first output signal based on the first input voltage, wherein the first output signal is proportional to the first input voltage in a first time period, inversely proportional to the first input voltage in a second time period, and proportional to the first input voltage in a third time period;

generating a second output signal based on the output current;

multiplying the first output signal by the second output signal to generate a multiplying signal; and generating a driving signal based on the multiplying signal to control a power switch of the converter, so as to reduce the ratio between the peak value and the average value of the output current.

17. The method of claim 16, wherein the first input voltage is a sinusoidal half-wave signal.

18. The method of claim 16, further comprising:

dividing the first input voltage to generate a second input signal; and generating the first output signal based on the second input signal.

19. The method of claim 18, further comprising:

generating a division signal inversely proportional to the second input signal; and generating the first output signal by selecting the signal having the lower amplitude among the second input signal and the division signal.

20. A switching power converter, comprising:

an input terminal configured to receive a first signal having a first input voltage and a first input current;

an output terminal configured to provide an output current to a load, wherein the output current has a peak value and an average value;

a power switch; and a controller coupled to the input terminal and the output terminal, configured to control the first input current by turning on/off the power switch, so as to reduce the ratio between the peak value and the average value of the output current, wherein the average value of the first input current is proportional to the first input voltage in a first time period, inversely proportional to the first input voltage in a second time period, and proportional to the first input voltage in a third time period.

* * * * *